United States Patent
Park et al.

(10) Patent No.: US 11,177,098 B2
(45) Date of Patent: Nov. 16, 2021

(54) DC CIRCUIT BREAKER HAVING ARC BLOWOUT DEVICE

(71) Applicant: LSIS CO., LTD., Anyang-si (KR)

(72) Inventors: Ji-Hong Park, Anyang-si (KR); Hye-Lim Yoon, Anyang-si (KR); Jae-Seop Kim, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 84 days.

(21) Appl. No.: 16/495,309

(22) PCT Filed: Sep. 7, 2017

(86) PCT No.: PCT/KR2017/009812
§ 371 (c)(1),
(2) Date: Sep. 18, 2019

(87) PCT Pub. No.: WO2018/182112
PCT Pub. Date: Oct. 4, 2018

(65) Prior Publication Data
US 2020/0111629 A1    Apr. 9, 2020

(30) Foreign Application Priority Data

Mar. 31, 2017  (KR) .................. 10-2017-0041694
Mar. 31, 2017  (KR) .................. 10-2017-0041695

(51) Int. Cl.
*H01H 33/59*    (2006.01)
*H01H 9/44*     (2006.01)
(Continued)

(52) U.S. Cl.
CPC .......... *H01H 33/596* (2013.01); *H01H 9/446* (2013.01); *H01H 33/185* (2013.01); *H02H 3/087* (2013.01)

(58) Field of Classification Search
CPC ...... H01H 9/446; H01H 33/185; H01H 33/59; H01H 33/596; H02H 3/087
(Continued)

(56) References Cited

U.S. PATENT DOCUMENTS

| 2,515,596 | A | * | 7/1950 | Griffes | ...................... H01H 9/44 218/30 |
| 7,417,520 | B2 | | 8/2008 | Kralik | |
| 2008/0197113 | A1 | * | 8/2008 | Martin | ...................... H01H 9/44 218/23 |

FOREIGN PATENT DOCUMENTS

| CN | 205789583 U | 12/2016 |
| JP | 2000164108 A | 6/2000 |

(Continued)

OTHER PUBLICATIONS

International Search Report for related International Application No. PCT/KR2017/009812; report dated Oct. 4, 2018; (3 pages).
(Continued)

*Primary Examiner* — Kevin J Comber
(74) *Attorney, Agent, or Firm* — K&L Gates LLP

(57) ABSTRACT

A DC circuit breaker having an arc blowout device according to the present invention comprises: a fixed contact; a movable contact operating so as to make contact with or separate from the fixed contact; an operation part for driving the movable contact; and a blowout device which provides a magnetic field in a direction crossing the arc generated when the movable contact is separated, wherein the blowout device includes: a pair of core plates arranged side by side on both sides of the movable contact and the fixed contact; core rods integrally connected to the core plates, respectively, and having symmetrical shapes to each other; and a blowout coil coupled to one of the core rods.

9 Claims, 9 Drawing Sheets

(51) Int. Cl.
*H01H 33/18* (2006.01)
*H02H 3/087* (2006.01)

(58) Field of Classification Search
USPC .............................................. 361/2
See application file for complete search history.

(56) References Cited

FOREIGN PATENT DOCUMENTS

| | | |
|---|---|---|
| JP | 2011228087 A | 11/2011 |
| JP | 2012064584 A | 3/2012 |
| KR | 20040007777 A | 1/2004 |
| KR | 20120040092 A | 4/2012 |
| KR | 20150075944 A | 7/2015 |

OTHER PUBLICATIONS

Written Opinion for related International Application No. PCT/KR2017/009812; report dated Oct. 4, 2018; (4 pages).
Chinese Office Action from corresponding Chinese Patent Application No. 201780088933.2, dated Nov. 24, 2020.

* cited by examiner

[FIG. 1]
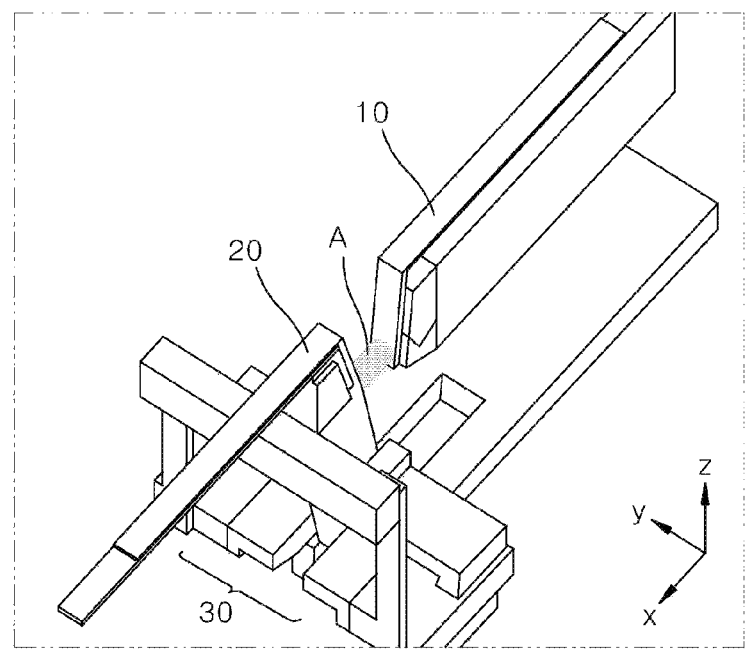

[FIG. 2]
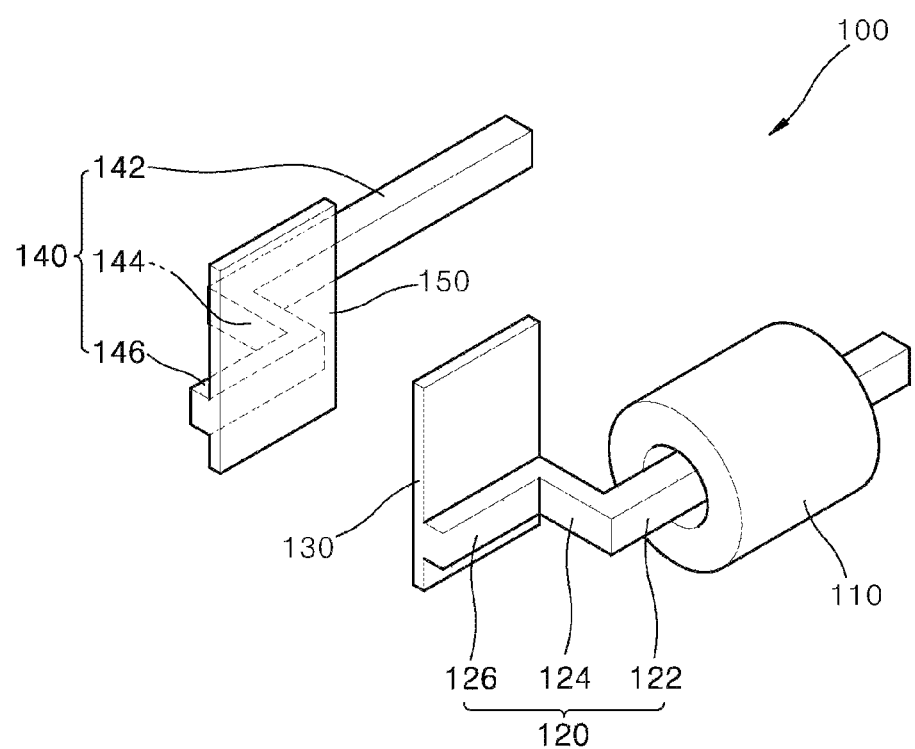

[FIG. 3]
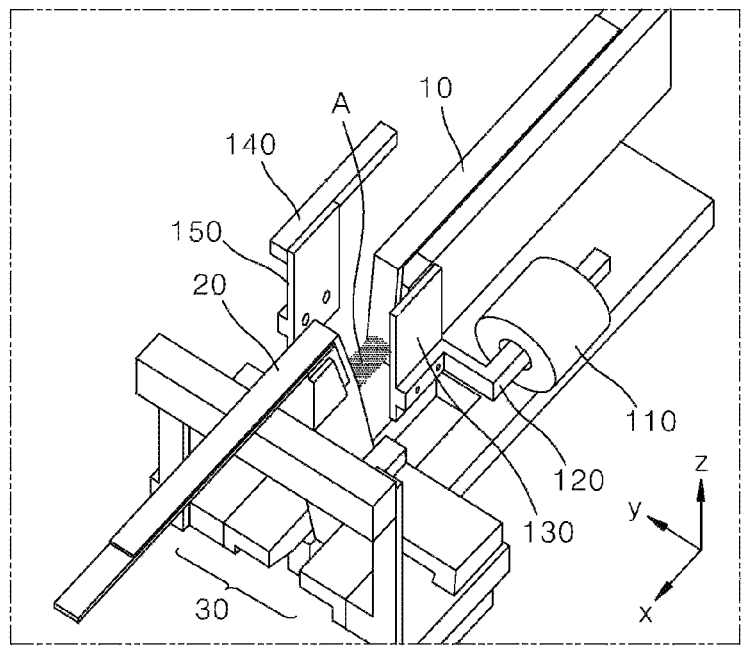

[FIG. 4]
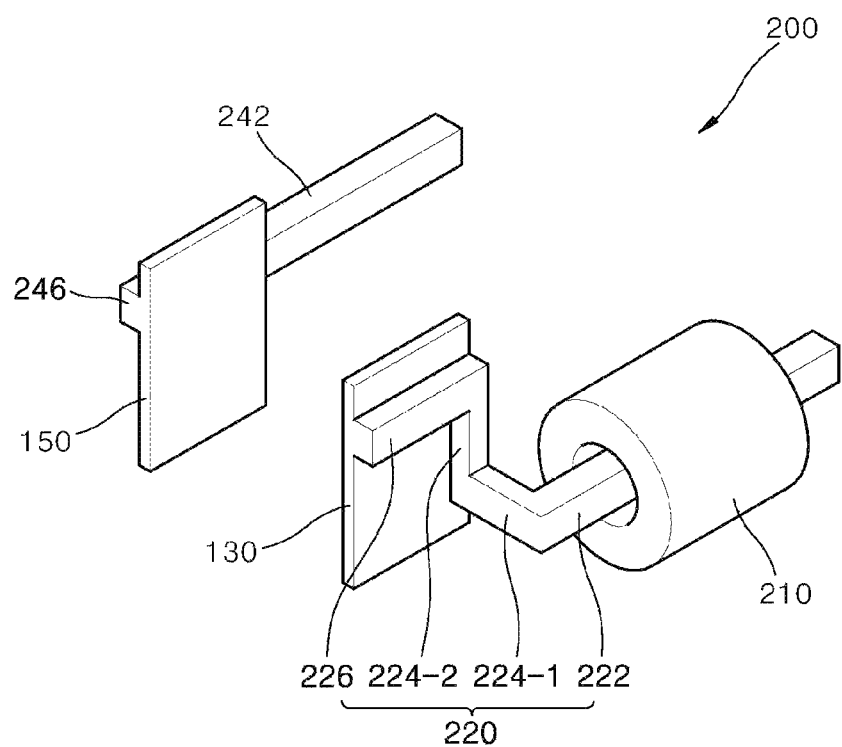

[FIG. 5]
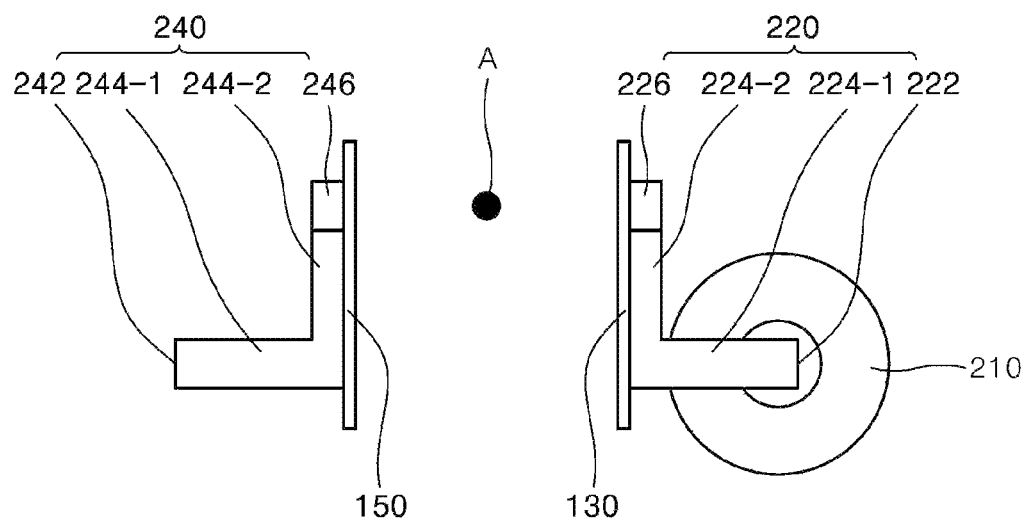

[FIG. 6]
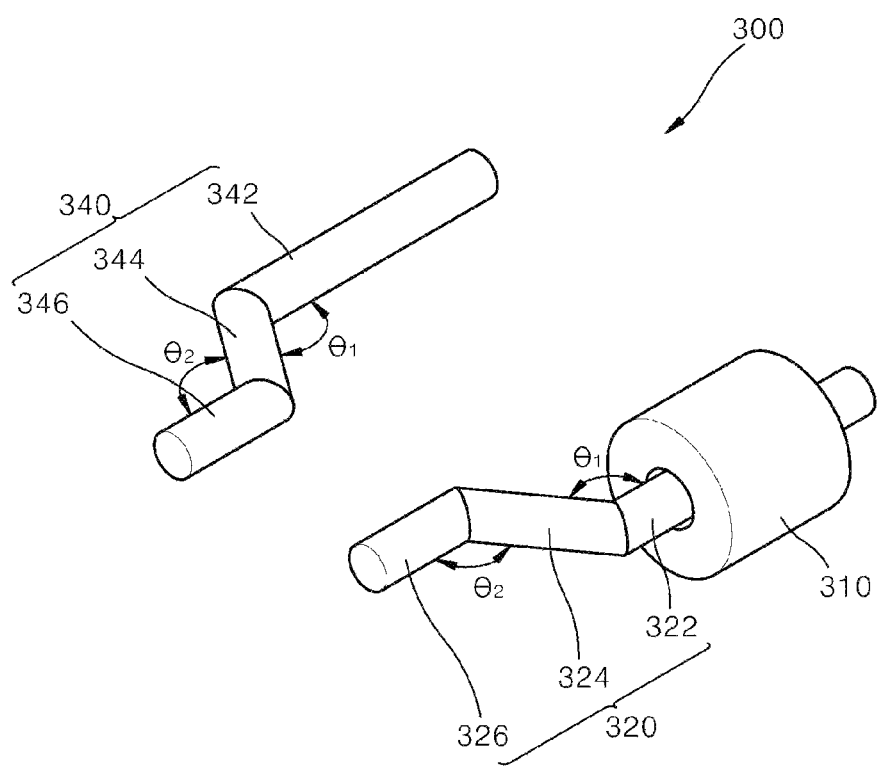

[FIG. 7]
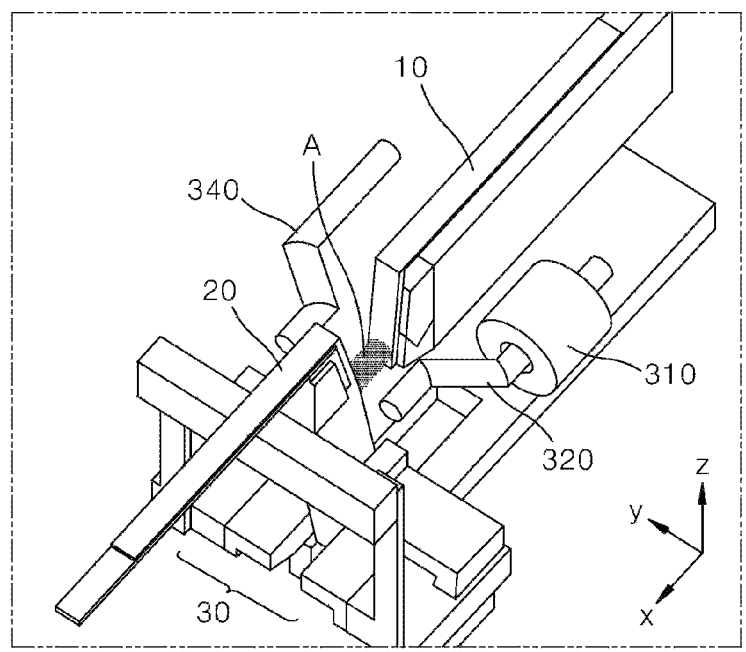

[FIG. 8]
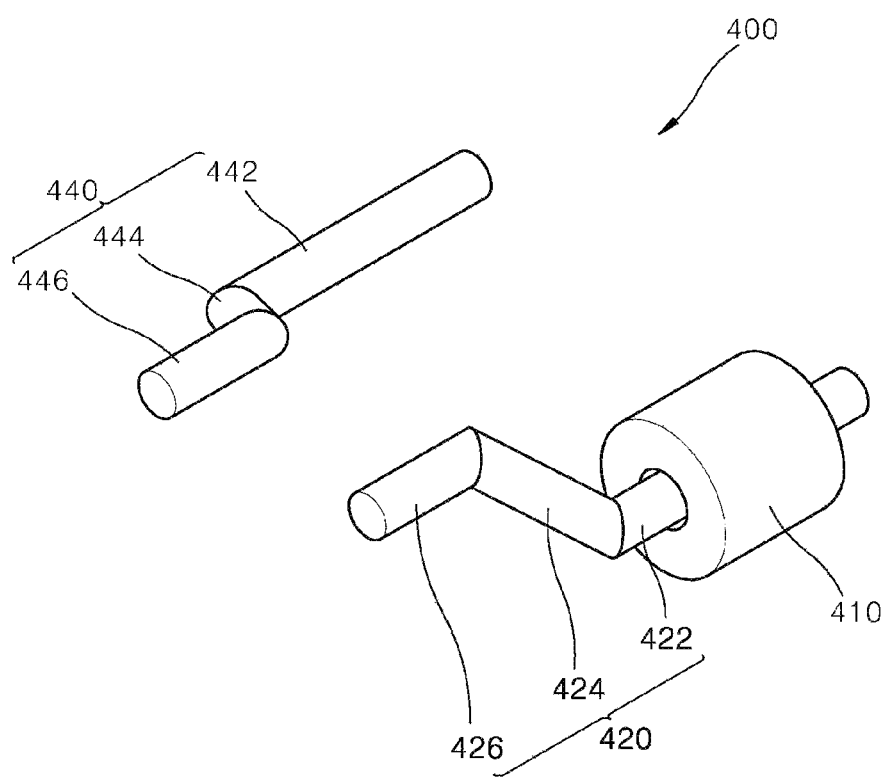

[FIG. 9]
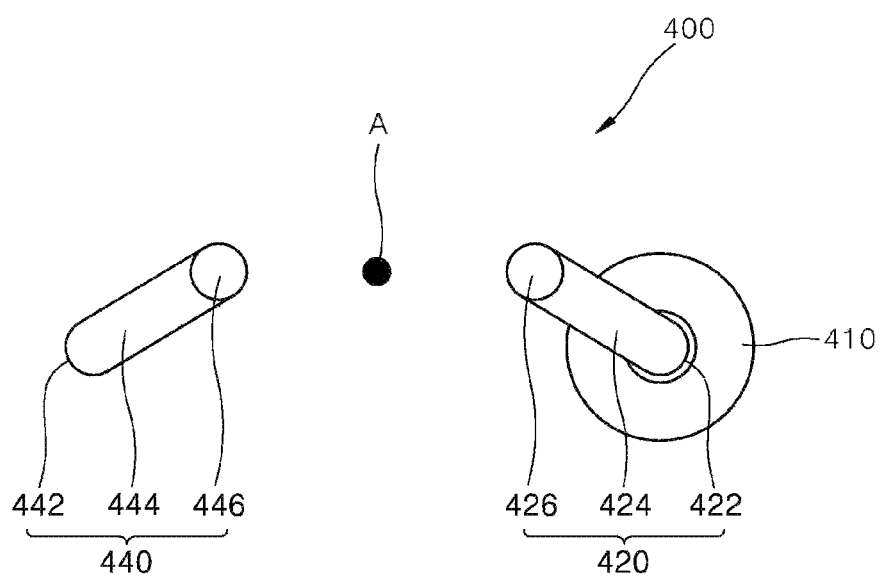

DC CIRCUIT BREAKER HAVING ARC BLOWOUT DEVICE

CROSS-REFERENCE TO RELATED APPLICATIONS

The present application is a National Stage of International Application No. PCT/KR2017/009812, filed on Sep. 7, 2017, which claims priority to Korean Application No. 10-2017-0041694, filed on Mar. 31, 2017 and Korean Application No. 10-2017-0041695, filed on Mar. 31, 2017 the disclosure of which are incorporated herein by reference.

TECHNICAL FIELD

The present disclosure relates to a DC circuit breaker, and more particularly to a DC circuit breaker with an arc blow-out device.

BACKGROUND ART

Under the same transmission capacity, DC has an advantage of reducing an amount of an electric wire and a size of a steel tower in comparison with AC. When the transmission capacity is the same, using DC can save an electric wire consumption by 30% compared with using AC. Due to this advantage, DC electrical distribution product market is gradually expanding.

Thus, demand for a DC circuit breaker is increasing in various fields such as LVDC (Low Voltage Direct Current), ESS (Energy Storage System), and Renewable Energy Market.

The DC circuit breaker has a defect detector therein so that when an abnormal current occurs in the DC circuit, the breaker detects abnormal current and interrupts the same at high-speed before open-state abnormal current reaches its maximum value. The DC circuit breaker has short response time after sensing short-circuit and over-current.

The DC circuit breaker is generally composed of a movable contact, a stationary contact, a driver, a trip unit, an extinguisher, and so on. The movable contact may be brought into contact with or may be separated from the stationary contact by the driver. When the abnormal current occurs in the DC circuit, the two contacts that were in contact with each other may be disconnected from each other by the trip unit.

When the two contacts that are in contact with each other in a current conduction state are separated from each other, an arc is generated between the two contacts. As the arc moves to the extinguisher, the circuit breaking may occur.

It is relatively difficult for the DC circuit breaker to break the DC circuit compared to the AC breaker because there is no natural zero point in the DC circuit breaker. As the current is smaller than a large current such as short-circuit current and overcurrent, it may be more difficult for the DC circuit breaker to break the circuit.

The arc generated during the separation between the contact moves to the extinguisher by a force generated by the Fleming's left-hand rule and an internal pressure. In this connection, the force as generated by the Fleming's left-hand rule is proportional to a magnitude of each of the current and a magnetic flux.

When the short-circuit current and over-current occur, the current is large and the internal pressure is large. Thus, the arc can be moved to the extinguisher sufficiently. However, when the current is small and the internal pressure is small, the arc stays between the stationary contact and the movable contact. This increases a likelihood that the circuit breaking will fail.

FIG. 1 shows a contact structure of a typical DC circuit breaker.

As shown, the DC circuit breaker includes a stationary contact 10, a movable contact 20 that moves to contact or to be disconnected to the stationary contact 20, and a driver 30 that moves the movable contact 20.

In the illustrated embodiment, the movable contact 20 reciprocates in an x-axis direction and contacts or separates from the stationary contact 10. In the separation, the arc A is generated in the x-axis direction.

In this connection, the current direction is the x-axis direction. Thus, when a magnetic field is applied in a y-axis direction, the arc A is subjected to a force in the Z-axis direction.

An extinguisher (not shown) is disposed above the stationary contact 10 and the movable contact 20. Thus, when the magnetic field is applied in the y-axis direction, the arc A between the stationary contact 10 and the movable contact 20 may move to the extinguisher.

A conventional arc blow-out device uses a permanent magnet or a blow-out coil.

When the blow-out device uses the permanent magnet, the direction of the magnetic field is fixed. This type blow-out device is suitable for a DC circuit breaker dealing with only a single direction current, but is not suitable for a DC circuit breaker dealing with a bi-directional current. This is because of followings: a force is exerted toward the extinguisher along an orthogonal line by a magnetic flux of the permanent magnet and a current having a forward direction; whereas when a reverse-directed current flows, a direction of the current is reversed, but a direction of the magnetic flux by the permanent magnet is fixed, such that the Fleming's left hand rule allows the force to act in the direction away from the extinguisher to prevents the arc from moving to the extinguisher.

On the other hand, when the blow-out device uses the blow-out coil, the blow-out device is divided into a first type in which an internal power is applied to the blow-out coil and a second type that a separate external power is applied to the coil.

In the first type in which an internal power is applied to the blow-out coil, an electric potential difference caused by the arc generated when the contacts is separated from each other is applied to the coil. In this connection, a voltage applied to the coil may vary, and, thus, a deviation of an interruption time is large and the interruption duration becomes abnormally long.

In the second type that a separate external power is applied to the coil, a constant external power source is applied to the coil. Thus, a deviation of an interruption time is small and the interruption time becomes constant, compared to the first type in which an internal power is applied to the blow-out coil.

DISCLOSURE

Technical Purpose

A purpose of the present disclosure is to shorten an arc extinguishing time by providing an arc blow-out device to a DC circuit breaker.

Another purpose of the present disclosure is to provide an arc blow-out device which can be installed in a DC circuit breaker with a limited internal space.

Still another purpose of the present disclosure is to provide a DC circuit breaker with an arc blow-out device that may effectively apply a magnetic field to an arc occurrence site.

Technical Solutions

In a first aspect of the present disclosure, there is proposed a direct current (DC) circuit breaker comprising: a stationary contact; a movable contact to move to contact or separate from the stationary contact; an actuator configured to move the movable contact; and a blow-out device configured to apply a magnetic field in a direction perpendicular to a length direction of an arc occurring when the movable contact is separated from the stationary contact, wherein the blow-out device includes: a pair of core plates, one thereof being disposed on one side face of the movable contact, the other thereof being disposed on the other face of the stationary contact opposite said one face; a pair of core rods integrally connected to the core plates respectively; and a blow-out coil coupled to one of the core rods.

In one implementation of the first aspect, the pair of core rods have symmetrical shapes with respect to the length direction of the arc.

In one implementation of the first aspect, the pair of core rods includes first and second core rods, wherein the first core rod includes: a first section inserted into the blow-out coil; a second section bent from the first section toward an arc occurrence region between the movable contact and the stationary contact; and a third section bent from the second section in a direction parallel to the length direction of the arc occurring in the arc occurrence region, wherein the second core rod has a symmetrical shape with the first core rod with respect to the length direction of the arc.

In one implementation of the first aspect, the second section includes: a horizontally-bent section bent in a direction perpendicular to a plane of a corresponding core plate; and a vertically-bent section bent in a direction parallel to the plane of the corresponding core plate. In one implementation of the first aspect, the first section and the third section have different vertical levels.

In one implementation of the first aspect, a cross-sectional shape of each core rod includes a triangular, quadrangle, or circular shape.

In a second aspect of the present disclosure, there is proposed a DC circuit breaker comprising: a stationary contact; a movable contact to move to contact or separate from the stationary contact; an actuator configured to move the movable contact; and a blow-out device configured to apply a magnetic field in a direction perpendicular to a length direction of an arc occurring when the movable contact is separated from the stationary contact, wherein the blow-out device includes: a blow-out coil: a first core including: a first section inserted into the blow-out coil; a second section bent from the first section toward an arc occurrence region between the movable contact and the stationary contact; and a third section bent from the second section in a direction parallel to the length direction of the arc occurring in the arc occurrence region; and a second core having a symmetrical shape with the first core with respect to the length direction of the arc.

In one implementation of the second aspect, each of a first bending angle $\theta_1$ between the first section and the second section and a second bending angle $\theta_2$ between the second section and the third section is obtuse.

In one implementation of the second aspect, each of the first bending angle $\theta_1$ between the first section and the second section and the second bending angle $\theta_2$ between the second section and the third section is in a range of 120° to 150°.

Technical Effects

The DC circuit breaker with the arc blow-out device according to the present disclosure has an effect of quickly extinguishing a small current arc.

Further, the DC circuit breaker with the arc blow-out device according to the present disclosure has an effect of securing a certain breaking performance by applying an external power to the blow-out coil.

Moreover, the DC circuit breaker with the arc blow-out device according to the present disclosure has only one blow-out coil, which simplifies a structure of the blow-out coil device and reduces a power required to operate the blow-out coil device.

BRIEF DESCRIPTION OF THE DRAWINGS

FIG. 1 shows a contact structure of a typical DC circuit breaker.

FIG. 2 shows an arc blow-out device according to a first embodiment of the present disclosure.

FIG. 3 shows a DC circuit breaker with an arc blow-out device according to a first embodiment of the present disclosure.

FIG. 4 shows an arc blow-out device according to a second embodiment of the present disclosure.

FIG. 5 is a front view of an arc blow-out device according to a second embodiment of the present disclosure.

FIG. 6 shows an arc blow-out device according to a third embodiment of the present disclosure.

FIG. 7 shows a DC circuit breaker with an arc blow-out device according to a third embodiment of the present disclosure.

FIG. 8 shows an arc blow-out device according to a fourth embodiment of the present disclosure.

FIG. 9 is a front view of an arc blow-out device according to a fourth embodiment of the present disclosure.

DETAILED DESCRIPTIONS

Embodiments shown herein and configurations shown in the drawings are only examples of the present disclosure. It is to be understood that since the embodiments and configurations are not intended to represent all of technical ideas of the present disclosure, various equivalents and modifications may be realized when filing the present application.

FIG. 2 shows an arc blow-out device according to a first embodiment of the present disclosure. FIG. 3 shows a DC circuit breaker with an arc blow-out device according to a first embodiment of the present disclosure.

The present disclosure provides an arc blow-out device that may be applied to a DC circuit breaker with a narrow inner space and provides a DC circuit breaker equipped with the arc blow-out device.

As shown, the DC circuit breaker according to the first embodiment of the present disclosure includes a stationary contact 10, a movable contact 20 movable to contact or separate from the stationary contact 10, an actuator 30 for driving the movable contact 20, and an arc blow-out device 100 for applying a magnetic field in a direction perpendicular to a direction of an arc generated when the movable contact 20 is separated from the stationary contact 10.

The blow-out device 100 according to a first embodiment of the present disclosure includes a pair of core plates 130 and 150 disposed on one side face of the stationary contact 10 and the other face of the movable contact 20 respectively, core rods 120 and 140 respectively connected to the pair of core plates 130 and 150, and a blow-out coil 110 coupled to one core rod 120 among the pair of core rods.

In the illustrated embodiment, the blow-out coil 110 is coupled to the right core rod 120. However, in another example, the blow-out coil 110 may be coupled to the left core rod 140. In other words, a position of the blow-out coil 110 may be selected depending on a structure of an internal space of the DC circuit breaker.

The blow-out device 100 according to the present disclosure includes the pair of core plates 130 and 150, the pair of core rods 120 and 140, and the single blow-out coil 110.

Conventionally, a conventional blow-out device has a pair of cores and a pair of blow-out coils in a symmetrical manner. In other words, conventionally, each of the two cores has each blow-out coil. However, a force for pushing out the arc blow is related to an intensity of a magnetic field in a direction orthogonal to a direction of the arc. Thus, the cores and the coils are not necessarily arranged in a symmetrical manner.

Thus, in accordance with the present disclosure, a magnetic field is applied in a direction orthogonal to a direction of the arc using the pair of core plates 130 and 150, the pair of core rods 120 and 140, and the single blow-out coil 110. This may simplify an overall structure of the blow-out coil device 100 and reduce a size thereof.

Referring to FIG. 2, the blow-out coil device 100 according to the present disclosure includes a right first core plate 130, a left second core plate 150, a right first core rod 120, a left second core rod 140, and a blow-out coil 110 coupled to the right first core rod 120.

The first core plate 130 and the second core plate 150 have the same shape and are arranged in parallel with each other. In this connection, the first core plate 130 and the second core plate 150 sandwiches the arc occurrence region. Thus, the arc may be pushed out and extinguished by a magnetic flux passing between the first core plate 130 and the second core plate 150.

The first core rod 120 and the second core rod 140 have line-symmetric three-dimensional shapes with respect to a length direction of the arc. The first core rod 120 and the second core rod 140 are symmetrically shaped to reduce a loss of the magnetic flux flowing through the first core rod 120 and the second core rod 140.

In one example, the blow-out coil 110 is powered by a separate external power source (not shown).

When a magnetic force is generated from the blow-out coil 110, the magnetic flux flows along the first core rod 120 and flows to the first core plate 130 and then flows in a perpendicular to the length direction of the arc (x-axis direction) and then flows through the second core plate 150 to the second core rod 140.

A magnitude of the magnetic field generated from the blow-out coil 110 varies depending on a voltage magnitude, coil turns count, coil material, and the like. A magnitude of the magnetic field increases as the voltage applied to the coil increases, as the coil turns count increases, and as the core area increases.

However, when the coil turns count of the blow-out coil 110 increases, an outer diameter of the blow-out coil 110 increases. As the outer diameter of the blow-out coil 110 increases, a spacing between the core inserted into the blow-out coil 110 and the side faces of the contacts may increase.

A magnetic flux of the magnetic field as generated substantially in the arc occurrence region may be inverse proportional to a spacing between the first core plate 130 and the second core plate 150. When the spacing between the first core plate 130 and the second core plate 150 increases, the magnetic flux in the arc occurrence region decreases.

The present disclosure is characterized in that the core rods 120 and 140 are bent so that the core plates 130 and 150 sandwiching the arc occurrence region may be more adjacent to the arc occurrence region.

As shown, the first core rod 120 according to the present disclosure are composed of three sections as follows. A first section 122 is inserted into the blow-out coil 110. A third section 126 applies a magnetic field to the arc. A second section 124 delivers the magnetic flux from the first section 122 to the third section 126.

In other words, the first core rod 120 includes the first section 122 as the portion inserted into the arc blow-out coil 110, the second section 124 bent toward the arc occurrence region from the first section 122, and the third section 126 bent from the second section 124 in a direction parallel to the arc occurrence direction.

This structure has an effect of ensuring a constant spacing between the core plates 130 and 150 even when the outer diameter of the blow-out coil 110 increases.

Therefore, even when the size of the coil is increased, the spacing between the cores can be kept constant. Thus, the single blow-out coil may be used to apply the magnetic flux needed to achieve the arc extinguishing performance.

In one example, each of the core plates 130 and 150 and the core rods 120 and 140 is preferably made of a ferromagnetic material. This is to reduce a loss of the magnetic flux through the core.

Further, each of the core rods 120 and 140 may be formed into a rod shape having a uniform cross-sectional area along a length direction thereof. In this case, a cross-sectional shape of each of the core rods 120 and 140 may have various shapes such as a circle, an ellipse, a triangle, and a quadrangle.

FIG. 4 shows an arc blow-out device according to a second embodiment of the present disclosure. FIG. 5 is a front view of an arc blow-out device according to a second embodiment of the present disclosure.

In the arc blow-out device according to the first embodiment as described above, the first section 122 and the third section 126 of the core are disposed on the same horizontal plane. Alternatively, in an arc blow-out device 200 according to the second embodiment of the present disclosure, the first section 222 and the third section 126 have different vertical levels.

The arc blow-out device 200 must be installed in a small inner space of the DC circuit breaker. Depending on a structure of the DC circuit breaker, it may be difficult to install the blow-out coil on the same vertical level as the arc generation region.

Thus, in this embodiment, the second section of the core rod is bent in a horizontal direction and a vertical direction.

As shown, the arc blow-out device 200 according to a second embodiment of the present disclosure includes a blow-out coil 210 and a pair of core plates 230 and 250 arranged in parallel with each other, a first core rod 220 inserted into the blow-out coil, and a second core rod 240 having a symmetric shape with respect to the first core rod 220.

In this connection, the first core rod 220 includes a first section 222 inserted into the blow-out coil 210, a horizontally-bent section 224-1 bent inwardly from the first section 222, a vertically-bent section 224-2 bent upwardly from the horizontally-bent section 224-1, and a third section 226 bent from the vertically-bent section 224-2.

As described above, the second core rod 220 has a symmetrical shape with the first core rod 240. A redundant description of the second core rod 220 is omitted.

In the first embodiment as described above, the first section 122 and the third section 126 are placed on the same plane. In the present embodiment, the first section 222 and the third section 226 are different vertical levels.

Accordingly, using the arc blow-out device 200 according to the second embodiment of the present disclosure, even when an installation vertical level of the blow-out coil 210 is lower than the vertical level of the arc occurrence region, the third section 226 may be positioned to be adjacent to face both sides of the arc occurrence region.

FIG. 6 shows an arc blow-out device according to a third embodiment of the present disclosure. FIG. 7 shows a DC circuit breaker with an arc blow-out device according to a third embodiment of the present disclosure.

As shown, the DC circuit breaker according to the third embodiment of the present disclosure includes a stationary contact 10, a movable contact 20 movable to contact or separate from the stationary contact 10, an actuator 30 for driving the movable contact, a blow-out device 300 for applying a magnetic field in a direction perpendicular to a length direction of an arc generated upon separation between the movable contact 20 and the stationary contact 10.

The blow-out device 300 according to the third embodiment of the present disclosure includes a pair of cores 320 and 340 disposed on one side face of the stationary contact 10 and the other face of the movable contact 20 respectively, and a blow-out coil 310 coupled to one core 320 of the pair of cores.

In the illustrated embodiment, the right core 320 is coupled to the blow-out coil 310. In another example, the left core 340 may be coupled to the blow-out coil 310. In other words, a position of the blow-out coil 310 may be selected depending on the structure of the internal space of the DC circuit breaker.

The blow-out coil device 300 according to the present disclosure includes a right first core 320, a left second core 340, and a blow-out coil 310 coupled to the first core 320.

The first core 320 and the second core 340 have a line-symmetric three-dimensional shape with respect to the length direction of the arc, that is, the x direction. Having the first core 320 and the second core 340 symmetrical with respect to the arc length direction is intended to reduce the loss of the magnetic flux flowing through the first core 320 and the second core 340.

When the magnetic force is generated from the blow-out coil 310, the magnetic flux flows along the first core 320 and flows in a perpendicular to the arc length direction and flows to the second core 340.

A magnitude of the magnetic field generated from the blow-out coil 310 depends on a voltage magnitude, the coil turns count, and the coil material. The strength of the magnetic field increases as the voltage applied to the coil is large, the coil turns count is large, and the core area is large. However, those factors affect the size, weight, installation space and cost of a DC circuit breaker.

Thus, when the coil turns count of the blow-out coil 310 increases, the outer diameter of the blow-out coil 310 increases. As the outer diameter of the blow-out coil 310 increases, a spacing between the core inserted into the blow-out coil 310 and the sides of the contacts may increase.

A magnitude of the magnetic field generated in the arc occurrence region is substantially inverse proportional to a distance between the first core 320 and the second core 340. Thus, when the spacing between the first core 320 and the second core 340 increases, the magnetic flux in the spaced region decreases.

The present disclosure is characterized in that the cores 320 and 340 are bent so that the cores sandwiching the arc occurrence region may be more adjacent to the arc occurrence region, as shown in FIG. 7.

As shown, the first core 320 according to the present disclosure is composed of three sections as follows. A first section 322 is inserted into the blow-out coil 310. A third section 326 applies a magnetic field to an arc. A second section 324 delivers the magnetic flux from the first section 322 to the third section 326.

The first core 320 includes the first section 322 that is inserted into the arc blow-out coil 310, the second section 324 that is bent toward the arc occurrence region from the first section 322, and the third section 126 bent in a direction parallel to the arc occurrence direction from the second section 324.

In this connection, each of a bending angle $\theta_1$ between the first section 322 and the second section 324 and a bending angle $\theta_2$ between the second section 324 and the third section 326 is preferably obtuse, and, more preferably, is in a range of 120 degrees to 150 degrees.

The illustrated embodiment shows an example in which each of $\theta_1$ and $\theta_2$ is 135 degrees.

The configuration that the bending angle of each of the cores 320 and 340 is obtuse is intended to reduce the loss of the magnetic flux through the cores 320 and 340.

This structure has an effect that a spacing between the cores 320 and 340 may be kept constant even when the outer diameter of the blow-out coil 310 increases.

Therefore, even when the size of the single coil increases, the spacing between the cores may be kept constant. Thus, the single blow-out coil may be used to apply the magnetic flux needed to achieve the arc extinguishing performance.

Each of the cores 320 and 340 may be formed into a rod shape having a constant cross-sectional area. In this case, the cross section of each of the cores 320 and 340 may have a circular, elliptical or polygonal shape. In another example, as shown in the figure, when each of the cores 320 and 340 has a circular cross section, the loss of the magnetic flux flowing in the core may be minimized.

FIG. 8 shows an arc blow-out device according to a fourth embodiment of the present disclosure. FIG. 9 is a front view of an arc blow-out device according to a fourth embodiment of the present disclosure.

The arc blow-out device according to the third embodiment as described above has the configuration that each first section 322 or 342 and each third section 326 or 346 of each core are disposed on the same plane. The arc blow-out device according to the fourth embodiment of the present disclosure has a configuration that each first section 422 or 442 and each third section 426 or 446 have different vertical levels.

The arc blow-out device must be installed in a small inner space of the DC circuit breaker. Depending on a structure of the DC circuit breaker, it may be difficult to install the blow-out coil on the same vertical level as the arc generation region.

In this case, in the present embodiment, the second section is bent in a horizontal direction and a vertical direction.

As shown, an arc blow-out device 400 according to a fourth embodiment of the present disclosure includes a blow-out coil 410, a first core 420 inserted into the blow-out coil 410, and a second core 440 having a symmetrical shape with the first core 420.

In this connection, the first core 420 includes a first section 422 that is inserted into the blow-out coil 410, a second section 424 that is bent upwardly and inwardly from the first section 422, and a third section 426 bent from the second section 424.

The second core 440 has a symmetrical shape with the first core 440. Thus, a redundant description of the second core 440 is omitted.

In the first embodiment as described above, each of the first sections 322 and 342 and each of the third sections 326 and 346 are placed on the same plane. In this embodiment, each of the first sections 422 and 442 and each of the third sections 426 and 446 have different vertical levels.

Accordingly, using the arc blow-out device 400 according to the fourth embodiment of the present disclosure, even when an installation vertical level of the blow-out coil 410 is lower than the vertical level of the arc occurrence region, each of the third sections 426 and 446 may be positioned to be adjacent to face both sides of the arc occurrence region.

As described above, although the arc blow-out device according to the present disclosure has a larger size of the arc blow-out coil, the spacing between the cores adjacent to the arc occurrence region may be kept constant. Thus, even when the internal space of the DC circuit breaker is narrow, a shape of the core is modified to be adapted to the shape of the DC circuit breaker, and the position of the blow-out coil is determined.

It should be understood that the above-described embodiments are illustrative in all aspects and not restrictive. The scope of the present disclosure will be indicated by the appended claims rather than the foregoing description.

What is claimed is:

1. A direct current (DC) circuit breaker comprising:
   a stationary contact;
   a movable contact to move to contact or separate from the stationary contact;
   an actuator configured to move the movable contact; and
   a blow-out device configured to apply a magnetic field in a direction perpendicular to a length direction of an arc occurring when the movable contact is separated from the stationary contact,
   wherein the blow-out device includes:
   a pair of core plates, one thereof being disposed on one side face of the movable contact, the other thereof being disposed on the other face of the stationary contact opposite said one face;
   a pair of core rods integrally connected to the core plates respectively; and
   a blow-out coil coupled to one of the core rods,
   wherein a first core rod of the pair of core rods includes a first section and a second section and the second section includes:
   a horizontally-bent section bent in a direction perpendicular to a plane of a corresponding core plate; and
   a vertically-bent section bent in a direction parallel to the plane of the corresponding core plate.

2. The DC circuit breaker of claim 1, wherein the pair of core rods have symmetrical shapes with respect to the length direction of the arc.

3. The DC circuit breaker of claim 2, wherein a cross-sectional shape of each core rod includes a triangular, quadrangle, or circular shape.

4. The DC circuit breaker of claim 1, wherein the pair of core rods includes the first rod and a second core rod,
   wherein the first core rod includes:
   the first section inserted into the blow-out coil;
   the second section bent from the first section toward an arc occurrence region between the movable contact and the stationary contact; and
   a third section bent from the second section in a direction parallel to the length direction of the arc occurring in the arc occurrence region,
   wherein the second core rod has a symmetrical shape with the first core rod with respect to the length direction of the arc.

5. The DC circuit breaker of claim 4, wherein the first section and the third section have different vertical levels.

6. A DC circuit breaker comprising:
   a stationary contact;
   a movable contact to move to contact or separate from the stationary contact;
   an actuator configured to move the movable contact; and
   a blow-out device configured to apply a magnetic field in a direction perpendicular to a length direction of an arc occurring when the movable contact is separated from the stationary contact,
   wherein the blow-out device includes:
   a blow-out coil;
   a first core including:
   a first section inserted into the blow-out coil;
   a second section bent from the first section toward an arc occurrence region between the movable contact and the stationary contact, wherein the second section includes:
   a horizontally-bent section bent in a direction perpendicular to a plane of a corresponding core plate; and
   a vertically-bent section bent in a direction parallel to the plane of the corresponding core plate; and
   a third section bent from the second section in a direction parallel to the length direction of the arc occurring in the arc occurrence region; and
   a second core having a symmetrical shape with the first core with respect to the length direction of the arc.

7. The DC circuit breaker of claim 6, wherein each of a first bending angle between the first section and the second section and a second bending angle between the second section and the third section is obtuse.

8. The DC circuit breaker of claim 7, wherein each of the first bending angle between the first section and the second section and the second bending angle between the second section and the third section is in a range of 120° to 150°.

9. The DC circuit breaker of claim 6, wherein the first section and the third section have different vertical levels.

* * * * *